(12) United States Patent
Kansal et al.

(10) Patent No.: US 8,233,885 B2
(45) Date of Patent: Jul. 31, 2012

(54) APPARATUS AND METHODS FOR PROVIDING ENHANCED MOBILE MESSAGING SERVICES

(75) Inventors: Sachin S. Kansal, Sunnyvale, CA (US); Robert Y. Haitani, Menlo Park, CA (US); David Matiskella, Mountain View, CA (US); Peter Fry, Andover, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 11/613,100

(22) Filed: Dec. 19, 2006

(65) Prior Publication Data

US 2008/0153459 A1    Jun. 26, 2008

Related U.S. Application Data

(60) Provisional application No. 60/825,044, filed on Sep. 8, 2006.

(51) Int. Cl.
*H04L 12/58* (2006.01)
(52) U.S. Cl. .............. 455/412.1; 455/414.1; 379/88.13; 709/206
(58) Field of Classification Search .................. 455/412, 455/412.2, 412.1, 566; 379/88.13, 265
See application file for complete search history.

(56) References Cited

U.S. PATENT DOCUMENTS

| | | | |
|---|---|---|---|
| 5,333,266 A | 7/1994 | Boaz et al. | |
| 5,708,655 A | 1/1998 | Toth et al. | |
| 5,901,211 A | 5/1999 | Dean et al. | |
| 6,055,510 A | 4/2000 | Henrick et al. | |
| 6,061,346 A | 5/2000 | Noedman | |
| 6,304,636 B1 | 10/2001 | Goldberg et al. | |
| 6,304,753 B1 | 10/2001 | Hartmaier | |
| 6,330,589 B1 | 12/2001 | Kennedy | |
| 6,463,154 B1 | 10/2002 | Patel | |
| 6,532,368 B1 | 3/2003 | Hild et al. | |
| 6,628,938 B1 | 9/2003 | Rachabathuni et al. | |
| 6,633,761 B1 | 10/2003 | Singhai et al. | |

(Continued)

FOREIGN PATENT DOCUMENTS

EP    1117185    7/2001

(Continued)

OTHER PUBLICATIONS

Ghauri, Irfan, et al., "Blind Channel Identification and Projection Receiver Determination for Multicode and Multirate Situations in DS-COMA Systems", IEEE XP-002233922, pp. 2197-2200, 2000.

(Continued)

*Primary Examiner* — Jean Gelin
*Assistant Examiner* — Gerald Johnson

(57) ABSTRACT

Various embodiments for providing enhanced mobile messaging services are described. In one or more embodiments, a mobile computing device may send and receive messages of different types. The wireless computing device may comprise a threading engine to determine a sender of a received message and/or a recipient of a sent message. The threading engine may be arranged to correlate received messages of different message types with a particular sender and sent messages of different types with a particular recipient. The wireless device may display a messaging thread comprising correlated messages of different message types in a messaging user interface supported by a messaging application. The different message types correlated within the message thread are not limited to a message type associated with the messaging application. Other embodiments are described and claimed.

41 Claims, 5 Drawing Sheets

U.S. PATENT DOCUMENTS

| | | |
|---|---|---|
| 6,658,254 B1 | 12/2003 | Purdy et al. |
| 6,671,735 B1 | 12/2003 | Bender |
| 6,751,453 B2 | 6/2004 | Schemers et al. |
| 6,763,235 B2 | 7/2004 | Imai |
| 6,778,644 B1 | 8/2004 | Jenkins et al. |
| 7,127,058 B2 * | 10/2006 | O'Connor et al. ....... 379/265.01 |
| 7,315,613 B2 * | 1/2008 | Kleindienst et al. ....... 379/88.13 |
| 7,328,242 B1 | 2/2008 | McCarthy et al. |
| 7,346,150 B2 * | 3/2008 | Frifeldt et al. ............. 379/88.12 |
| 7,383,307 B2 | 6/2008 | Kirkland et al. |
| 7,421,690 B2 | 9/2008 | Forstall et al. |
| 7,430,409 B2 * | 9/2008 | Klassen et al. ............. 455/412.1 |
| 2002/0016735 A1 | 2/2002 | Runge et al. |
| 2003/0005058 A1 | 1/2003 | Sorotzkin et al. |
| 2003/0033582 A1 | 2/2003 | Klein et al. |
| 2003/0070176 A1 | 4/2003 | Parker et al. |
| 2003/0135574 A1 | 7/2003 | Burg |
| 2004/0075691 A1 | 4/2004 | Moon |
| 2004/0088359 A1 * | 5/2004 | Simpson ....................... 709/206 |
| 2004/0137884 A1 * | 7/2004 | Engstrom et al. .......... 455/414.1 |
| 2004/0266411 A1 * | 12/2004 | Galicia et al. ............. 455/414.4 |
| 2005/0043036 A1 | 2/2005 | Ioppe et al. |
| 2005/0043037 A1 | 2/2005 | Ioppe et al. |
| 2006/0013368 A1 * | 1/2006 | LaBaw ....................... 379/88.13 |
| 2006/0166650 A1 * | 7/2006 | Berger et al. ............. 455/412.1 |
| 2007/0005715 A1 | 1/2007 | LeVasseur et al. |
| 2008/0037721 A1 | 2/2008 | Yao et al. |
| 2008/0104173 A1 | 5/2008 | Wilcox et al. |
| 2008/0172462 A1 | 7/2008 | Carrer et al. |

FOREIGN PATENT DOCUMENTS

| | | |
|---|---|---|
| WO | 2008030967 A2 | 3/2008 |
| WO | 2008030967 A3 | 3/2008 |

OTHER PUBLICATIONS

Tripathi, Vinayaik, et al., "Multiple Access Interference Resistant Channel Acquisition for Wideand COMA Signals", IEEE, pp. 956-960, 2000.

"Zimbra Email", Retrieved at <<http://www.hmc.edu/about/administrativeoffices/cis1/docs1/central1/email1/zimbra1/email.html>>, Sep. 26, 2008, pp. 6.

"CosmoCall Universe", Retrieved at <<http://www.cosmocom.com/productinfo/CollateralMaterials/CosmoCallAgentFeatures.pdf>>, pp. 2.

"PeopleSoft 8: Web-based Applications Armada", Retrieved at <<http://findarticles.com/p/articles/mi_qa3973/is_200009/ai_n8922878>>, Sep. 26, 2008, pp. 5.

"Contact Center Software", Retrieved at <<http://www.genesyslab.com/products/contact_center_software.asp>>, Sep. 26, 2008, p. 1.

"Siemens HiPath ProCenter Multimedia", Retrieved at <<http://health.siemens.com/portfolio/documents/comm_infrastr/contact_centers/hipath_procenter.pdf>>, pp. 5.

* cited by examiner

APPARATUS AND METHODS FOR PROVIDING ENHANCED MOBILE MESSAGING SERVICES

RELATED APPLICATIONS

This application claims priority to U.S. Provisional Patent Application Ser. No. 60/825,044 filed on Sep. 8, 2006, U.S. patent application Ser. No. 11/200,502 filed on Aug. 8, 2005, and U.S. patent application Ser. No. 10/759,597 filed on Jan. 15, 2004. These applications are incorporated by reference in their entirety.

BACKGROUND

A mobile computing device such as a combination handheld computer and mobile telephone or smart phone generally may provide voice and data communications functionality, as well as computing and processing capabilities. In addition to supporting telephone and voicemail services, a mobile computing device may support various other types of mobile messaging services such as facsimile, e-mail, instant messaging (IM), short message service (SMS) messaging, multimedia message service (MMS) messaging, video conferencing, and so forth. Accordingly, there may be a need for an improved apparatus and methods for providing enhanced mobile messaging services.

DETAILED DESCRIPTION

Various embodiments are directed to providing enhanced mobile messaging services. In one or more embodiments, a mobile computing device may send and receive messages of different types. The wireless computing device may comprise a threading engine to determine a sender of a received message and/or a recipient of a sent message. The threading engine may be arranged to correlate received messages of different message types with a particular sender and sent messages of different types with a particular recipient. The wireless device may display a messaging thread comprising correlated messages of different message types in a messaging user interface supported by a messaging application. The different message types correlated within the message thread are not limited to a message type associated with the messaging application.

Figure 1:
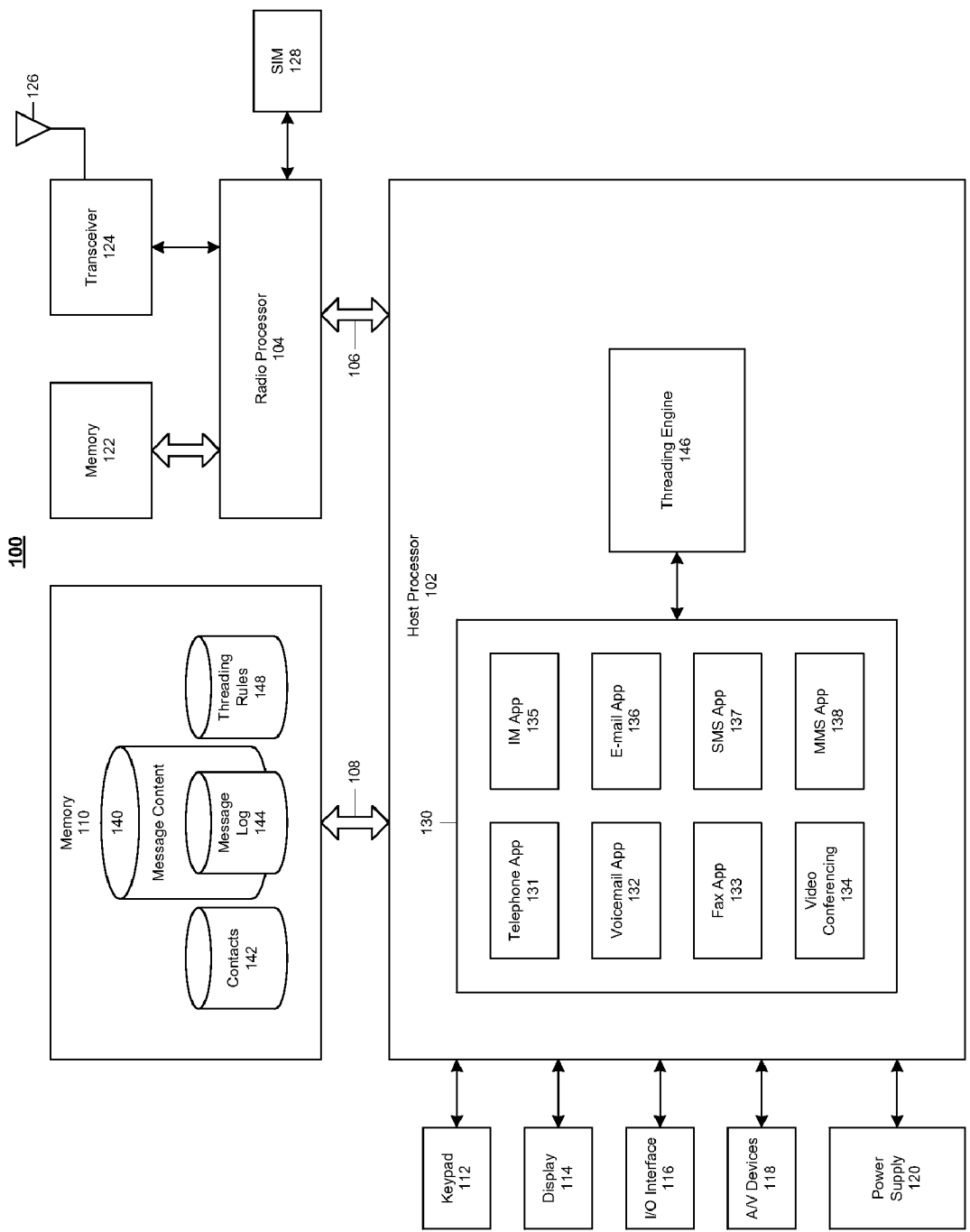
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, the mobile computing device 100 may comprise or implement several messaging applications 130 arranged to communicate various types of messages in a variety of formats. Each of the messaging applications 130 may be representative of a particular kind of transport, enabling handling of messages of particular types and formats for the particular application. The messaging applications 130 may comprise, for example, a telephone application 131 such as a cellular telephone application, a Voice over Internet Protocol (VoIP) application, a Push-to-Talk (PTT) application, and so forth. The messaging applications 130 may further comprise a voicemail application 132, a facsimile application 133, a video teleconferencing application 134, an IM application 135, an e-mail application 136, an SMS application 137, and an MMS application 138. It is to be understood that the embodiments are not limited in this regard and that the messaging applications 130 may include any other type of messaging or communications application which is consistent with the described embodiments. It also is to be appreciated that the mobile computing device 100 may implement other types of applications in addition to messaging applications 130 which are consistent with the described embodiments.

The mobile computing device 100 may comprise a message content database 140. The message content database 140 may be arranged to store content and attachments (e.g., media objects) of messages sent and received by the messaging applications 130. The message content database 140 may be implemented in the memory 110 of the mobile computing device, for example.

The mobile computing device 100 also may comprise a contacts database 142. The contacts database 142 may be arranged to store contact records for individuals or entities specified by the user of the mobile computing device 100. The contact record for an individual may comprise identifying information such as first name, last name, company/employer name, mailing addresses (e.g., home, work, other), telephone numbers (e.g., home, work, mobile, fax, pager), e-mail address (e.g., home, work, primary, alternative), IM screen names, SMS identifier, MMS identifier, personal information, notes, and so forth.

The contacts database 142 may be used or accessed when receiving and/or sending messages. In various embodiments, identifying information (e.g., telephone number, e-mail address, IM screen name, SMS identifier, MMS identifier, etc.), included in messages received by the messaging applications 130 may be compared against the contacts database 142 to identify the sender of a message. The contacts database 142 also may be used or accessed when composing and/or sending messages. For example, the user of the mobile computing device 100 may search for and open the contact record of a particular individual to initiate communication. In addition, contact records in the contacts database 142 may be filtered and matched against text typed by a user in one or more messaging applications 130 to facilitate message addressing.

The mobile computing device 100 may comprise a message log 144. The message log 144 may be arranged to track various types of messages which are sent and received by the mobile computing device. Entries in the message log 144 may reflect recently made or attempted communications. In various implementations, the entries in the message log 144 may be accessed by the user for replying to a missed message and/or for reinitiating or reattempting communication with a particular individual.

As shown in FIG. 1, the mobile computing device 100 may comprise or implement a threading engine 146 coupled to the messaging applications 130. In various embodiments, the threading engine 146 may be arranged to access to and communicate with one or more of the message content database 140, the contacts database 142, and the message log 144. The threading engine 146 may comprise, for example, hardware and/or software such as threading logic (e.g., instructions, data, and/or code) to be executed by a logic device (e.g., host processor 102). The threading logic may be stored internally or externally to the logic device on one or more types of computer-readable storage media. In various implementations, the threading engine 146 may communicate with a threading rules database 148 arranged to store rules and parameters for controlling the performance of threading operations for different types of messages.

In various embodiments, the threading engine 146 may be arranged to generate a message thread associated with a particular sender or recipient for different message types and/or formats. The threading engine 146 may be arranged, for example, to determine the sender of an incoming or received message as well as to determine the recipient of an outgoing or sent message. The sender or the recipient may be determined by the threading engine 146 using various types of identifying information associated with a particular message such as a telephone number, e-mail address, IM screen name, SMS identifier, MMS identifier, and so forth.

In various implementations, the threading engine 146 may match identifying information associated with an incoming or outgoing message against contact records stored in the contacts database 142. In such implementations, messages of different types may be correlated and threaded together for a particular known contact. For example, a contact record may comprise a name, telephone number, e-mail address, and an IM screen name for a known contact. In this case, identifying information associated with several different types of messages such as telephone messages, voicemail messages, fax messages, SMS messages, MMS messages, e-mail messages, and IM messages all may be matched against the contact record to correlate and thread together messages for the known contact.

It can be appreciated that, in some cases, the threading engine 146 may be able to correlate and thread different types of messages together without using the contact records of the contacts database 142. For example, the threading engine 146 may use a telephone number to correlate and thread together different types of messages such as telephone messages, voicemail messages, fax messages, SMS messages, and MMS messages.

In some cases, threading may be performed for all incoming and outgoing messages. In other cases, threading may be performed for only selected contacts. It can be appreciated that threading may be performed for a selected individual contact as well as a selected group of contacts, such as family members or employees of a particular organization.

Once the threading engine 146 has correlated messages with a particular sender or recipient, the mobile computing device 100 may display a message thread comprising correlated messages of various types and formats. The message thread may be displayed to the user of the mobile computing device 100 through a messaging UI, for example. In various embodiments, the messaging UI used to display the message thread generally may be supported by a particular messaging application such as one of the messaging applications 130 (e.g., telephone application 131, voicemail application 132, facsimile application 133, video teleconferencing application 134, IM application 135, e-mail application 136, SMS application 137, or MMS application 138). In such embodiments, however, the types of messages correlated within the message thread are not limited to the particular type(s) of messages generally associated with the supporting messaging application.

In one embodiment, for example, a messaging UI supported by the SMS application 137 may be used to display a message thread. In this embodiment, the messaging UI supported by the SMS messaging application 137 may display a message thread comprising SMS messages, MMS messages, as well as, telephone messages, voicemail messages, fax messages, video conferencing messages, IM messages, and e-mail messages. The embodiments, however, are not limited to this example.

Figure 2:
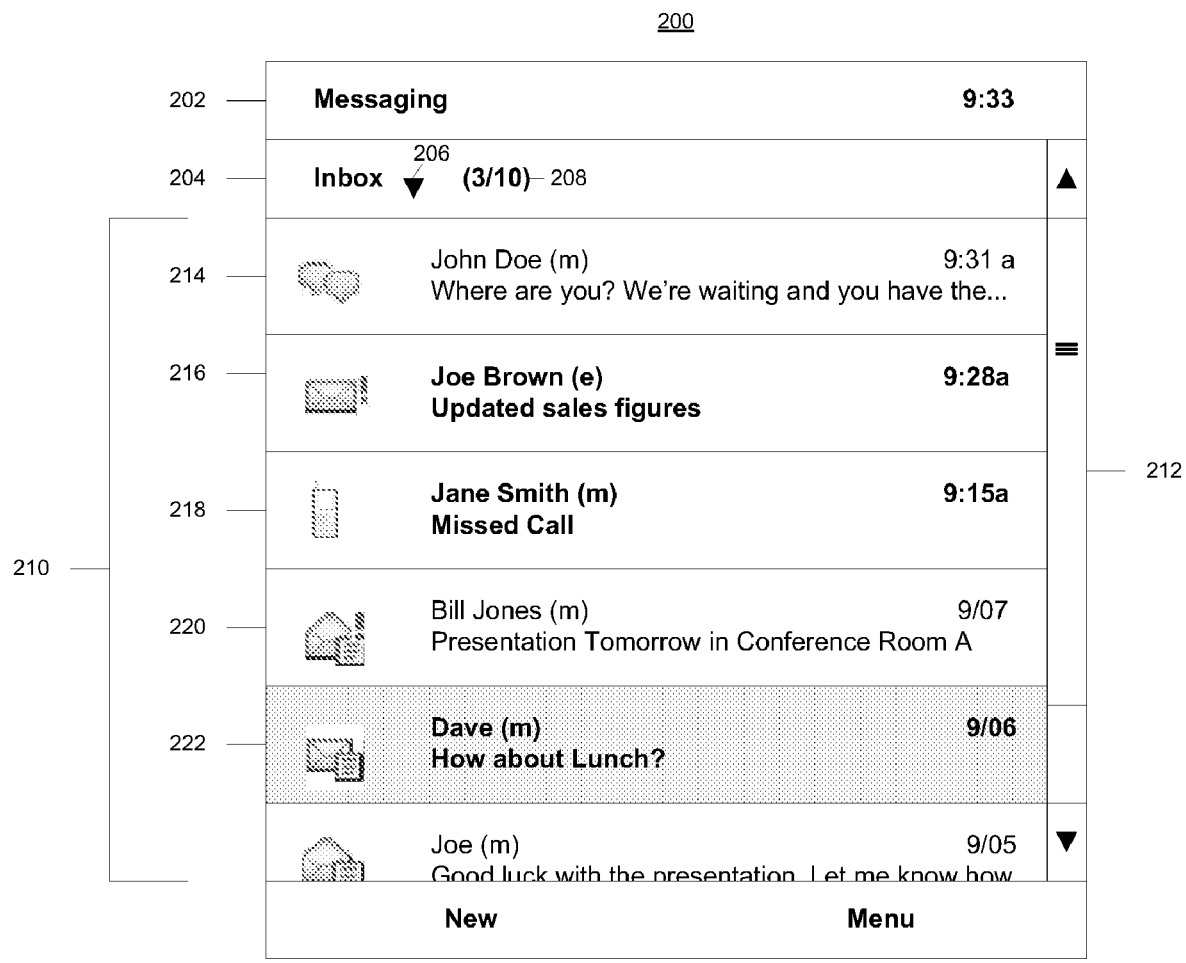
FIG. 2 illustrates a messaging user interface in accordance with one or more embodiments.

FIG. 2 illustrates a messaging UI 200 in accordance with one or more embodiments which may be displayed to a user of the mobile computing device 100 of FIG. 1. In various embodiments, the messaging UI 200 may be supported by an application such as an SMS application. For example, the messaging UI 200 may comprise an SMS list view messaging UI. The embodiments, however, are not limited in this context.

As shown, the messaging UI 200 may comprise a title bar 202 for displaying the title of a particular messaging application and the current time. The messaging UI 200 also may comprise a folder bar 204 including a drop-menu button 206 to select among various folders supported by the messaging application. Exemplary folders may include, without limitation, an Inbox folder, an Outbox folder, a Sent Items folder, a Drafts folder, a Saved folder, a Templates folder, and so forth. As shown, the Inbox folder is displayed in the messaging UI 200. The folder bar 204 may comprise a message count 208 indicating the number of messages in the folder along with the number of unread items.

In various embodiments, the messaging UI 200 may be arranged to display a message list 210 comprising details for various message items. The messaging UI 200 may comprise a scroll bar 212 if necessary to scroll through the message items in the message list 210. The message items in the message list 210 generally may be sorted in various ways such as by time of receipt, by sender name, by message type, and so forth. As shown, the message items displayed in the message list 210 are sorted by time of receipt.

In this embodiment, each of the message items in the message list 210 may comprise a two line message description which is bold if unread and plan if read. As shown, each of the message items may display sender information as well as time/date information in the first line. In some cases, the sender information may be truncated to ensure the display of the date/time information. If the date stamp of a sent/received message is the current day, then the time may be displayed. If the date stamp of a sent/received message is earlier than the current day, then the date may be displayed in short system format (e.g., MM/DD).

Examples of sender information may comprise a contact name if matched through a reverse look up in the contact records, caller ID, telephone number, e-mail address, IM screen name, SMS identifier, MMS identifier, and so forth. In various implementations, the sender information may be hyperlinked whether there is a contact match or not to allow for allowing the user to reply to the message item and/or to add the sender to contacts. In some embodiments, the user may type partial or complete sender information into a text box for filtering the items of the message list 210 by sender and/or to display in the message list 210 only those messages associated with a particular sender.

If the message item includes a subject line in the header, the second line of the message description may display the text of the subject line. Otherwise, the second line of the message description may display text from within the message. The message item may display as much of the content of the message as will fit in one line. In some cases, carriage returns may be stripped out so that more message text may be displayed.

In various embodiments, each of the message items in the message list 210 may display an icon indicating message type and current message status. Exemplary icons may include, without limitation, a message thread, a read message, an unread message, a missed message, a sent message, a received message (e.g., full receipt, partial receipt), a priority message (e.g., high, normal, low), a sending error message, and so forth.

As shown in FIG. 2, the message list 210 of the messaging UI 200 may be arranged to display message items of various types and formats. In this embodiment, the message list 210 includes a message item 214 comprising a message thread. The message item 214 may be arranged to display the last sent or received message from the message thread. In this example, the message item 214 is displaying the last sent message (e.g., SMS message) of a message thread associated with a contact (e.g., John Doe). The message item 214 displays the identified sender (e.g., John Doe), the time of receipt (e.g., 9:31 a.m.), text from the SMS message, and a chat bubble icon. In various implementations, the chat bubble icon may be used to indicate a message thread. It can be appreciated that any suitable icon may be used to indicate a message thread.

The message list 210 includes a message item 216 comprising a high priority unread e-mail message that displays the identified sender (e.g., Joe Brown), the time of receipt (e.g., 9:31 a.m.), the subject of the e-mail message, and an unread e-mail icon. The message list 210 includes a message item 218 comprising a missed telephone call that displays the identified sender (e.g., Jane Smith), the time of receipt (e.g., 9:15 a.m.), and a telephone icon. The message list 210 includes a message item 220 comprising a high priority read SMS message that displays the identified sender (e.g., Bill Jones), the date of receipt (e.g., September 2007), the subject of the SMS message, and a high priority read SMS icon.

The message list 210 also includes a message item 222 comprising an unread SMS message that displays the identified sender (e.g., Dave), the date of receipt (e.g., September 2006), text from the SMS message, and an unread SMS icon. In this embodiment, the background of the message item 222 may be grayed out or shaded to indicate the aging or relevance of the unread SMS icon. In various implementations, the user may configure message preferences for changing the appearance of messages based on when the message was received. For example, the appearance of messages which are older than a certain number of hours or days may appear differently from recent message so that the user may avoid responding to a message which is no longer relevant. It can be appreciated that different aging or relevance preferences may be set and different appearance changes may be used for different types of messages. In some embodiments, the content of a message may be parsed to identify certain words (e.g., lunch), and the appearance of the message may be changed after a certain time (e.g., 2:00 p.m.). In some embodiments, the appearance of a message from a particular individual may be changed in the event that a message is sent subsequently to the individual. The embodiments are not limited in this context.

Figure 3:
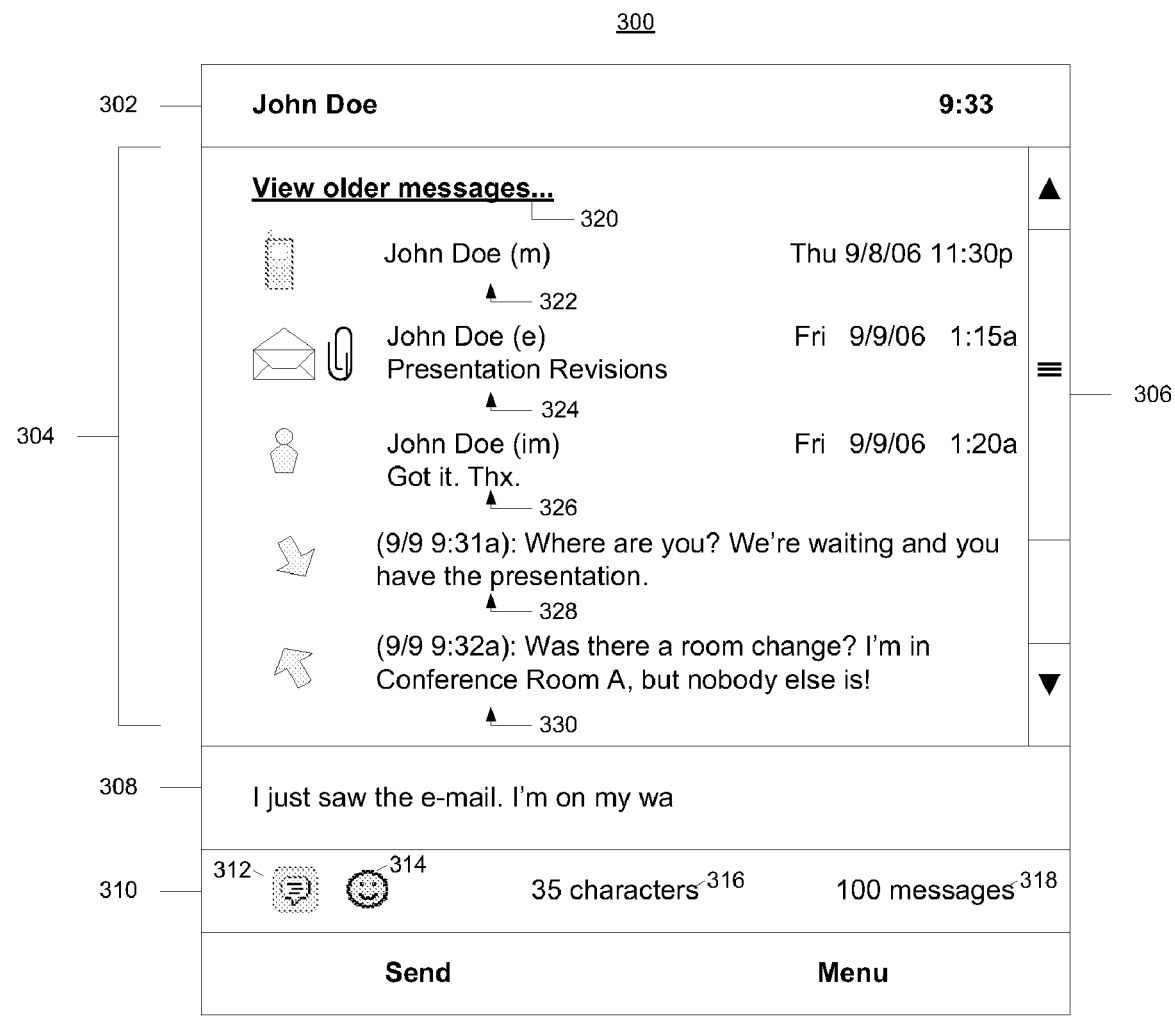
FIG. 3 illustrates a messaging user interface in accordance with one or more embodiments.

FIG. 3 illustrates a messaging UI 300 in accordance with one or more embodiments which may be displayed to a user of the mobile computing device 100 of FIG. 1. In various embodiments, the messaging UI 300 may be supported by an application such as an SMS application. For example, the messaging UI 300 may comprise an SMS chat view messaging UI. The embodiments, however, are not limited in this context.

In various implementations, the messaging UI 300 may be presented to a user by selecting a message thread from a message list. For example, the messaging UI 300 may be presented to a user when the message item 214 is selected. It can be appreciated, however, that the embodiments are not limited in this context and that the user may navigate to various embodiments of the UI 300 in a variety of ways such as from a contact record of the sender, an alert message, or other messaging UI.

As shown, the messaging UI 300 may comprise a title bar 302 for displaying a particular contact (e.g., sender/recipient) and the current time. In various embodiments, the messaging UI 300 may be arranged to display a message thread 304 comprising various message items. The messaging UI 300 may comprise a scroll bar 306 if necessary to scroll through the messages in the message thread 304. The messages in the message thread 304 generally may be sorted in various ways. As shown, the messages displayed in the message thread 304 are sorted by time of receipt.

The messaging UI 300 may comprise a message composition area 308 for entering message text and a status bar 310. As shown, the status bar 310 may comprise a text button 312 for displaying a pop-up list of boilerplate text strings that can be inserted into messages and edited. The status bar 310 may comprise an emoticon button 314 to display a pop-up of emoticons that can be inserted into the text area. The status bar 310 may comprise a character counter 316 to display the total number of characters in the current message and a message counter 318 to displays the current number of messages.

In various embodiments, the messaging UI 300 may comprise a hyperlink 320 to retrieve archived messages. In one embodiment, for example, the messaging UI 300 may be arranged to show a maximum number (e.g., 50) of recent messages exchanged between the user and the contact. By clicking on the hyperlink 320, the user may view all the previous messages. In general, providing the hyperlink 320 to archived messages may improve the rendering time of the messaging UI 300 and allow the user to launch the messaging UI 300 immediately as well as retaining access to numerous and/or old messages. In some cases, the user may run a purge command to delete messages.

As shown in FIG. 3, the message thread 304 may be arranged to display messages of various types and formats. In this embodiment, the message thread 304 includes a message 322 comprising a telephone call that displays linked telephone number information of the contact and the date of receipt (e.g., Thu Sep. 8, 2006 11:30 p.m.). The message thread 304 includes a message 324 comprising a received and read e-mail message with an attachment that displays linked e-mail address information of the contact, the subject of the e-mail message, and the date of receipt (e.g., Fri Sep. 9, 2006 1:15 a.m.). The message thread 304 includes a message 326 comprising a sent IM message that displays linked IM screen name information of the contact, the text of the IM message, and the date sent (e.g., Fri Sep. 9, 2006 1:20 a.m.). In some embodiments, an IM icon associated with the message 326 may indicate whether the contact is currently online and available to receive an IM message.

The message thread 304 includes a message 328 comprising a received and read SMS message that displays the date of receipt (e.g., Sep. 9, 2006 9:31 a.m.) and the text of the SMS message. The message thread 304 includes a message 330 comprising a sent SMS message that displays the date sent (e.g., Sep. 9, 2006 9:32 a.m.) and the text of the SMS message.

In this embodiment, the messaging 300 UI may be supported by an SMS messaging application. In this embodiment, however, the types of messages correlated within the message thread 304 are not limited to the particular type(s) of messages generally associated with the supporting SMS messaging application. It can be appreciated that the embodiments are not limited in this context and that other embodiments may be implemented using various types of messages as well as various types of supporting messaging applications.

Figure 4:
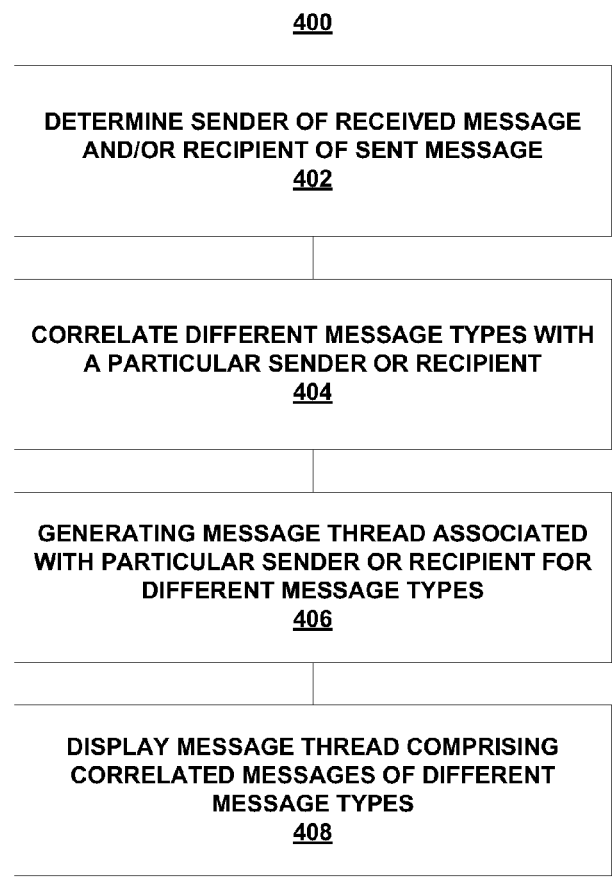
FIG. 4 illustrates a logic flow in accordance with one or more embodiments.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., threading logic) comprising instructions, data, and/or code to be executed by a logic device. For purposes of illustration, and not limitation, the logic flow 400 is described with reference to FIG. 1. The embodiments are not limited in this context.

In various embodiments, the logic flow 400 may comprise determining the sender of a received message and/or the recipient of a sent message (block 402). The sender or the recipient may be determined using various types of identifying information associated with a particular message such as a telephone number, e-mail address, IM screen name, SMS identifier, MMS identifier, and so forth.

The logic flow 400 may comprise correlating different message types with a particular sender or recipient (block 404). In some embodiments, correlating may comprise matching identifying information associated with an incoming or outgoing message against stored contact records. In such embodiments, messages of different types may be correlated and threaded together for a particular known contact. For example, a stored contact record may comprise a name, telephone number, e-mail address, and an IM screen name for a known contact. In this case, identifying information associated with several different types of messages such as telephone messages, voicemail messages, fax messages, SMS messages, MMS messages, e-mail messages, and IM messages all may be matched against the contact record to correlate and thread together messages for the known contact.

In some embodiments, correlating may be accomplished without using stored contact records. For example, a telephone number may be used to correlate and thread together different types of messages such as telephone messages, voicemail messages, fax messages, SMS messages, and MMS messages.

The logic flow 400 may comprise generating a message thread associated with a particular sender or recipient for different message types (block 406). In some embodiments, threading may be performed for all incoming and outgoing messages. In other cases, threading may be performed for only selected contacts. It can be appreciated that threading may be performed for a selected individual contact as well as a selected group of contacts, such as family members or employees of a particular organization.

The logic flow 400 may comprise displaying a message thread comprising correlated messages of different message types (block 408). The message thread may be displayed to the user of a mobile computing device through a messaging UI, for example. The messaging UI used to display the message thread generally may be supported by a particular messaging application such as a telephone application, voicemail application, facsimile application, video teleconferencing application, IM application, e-mail application, SMS application, or MMS application. The types of messages correlated within the message thread, however, are not limited to the particular type(s) of messages generally associated with the supporting messaging application.

Figure 5:
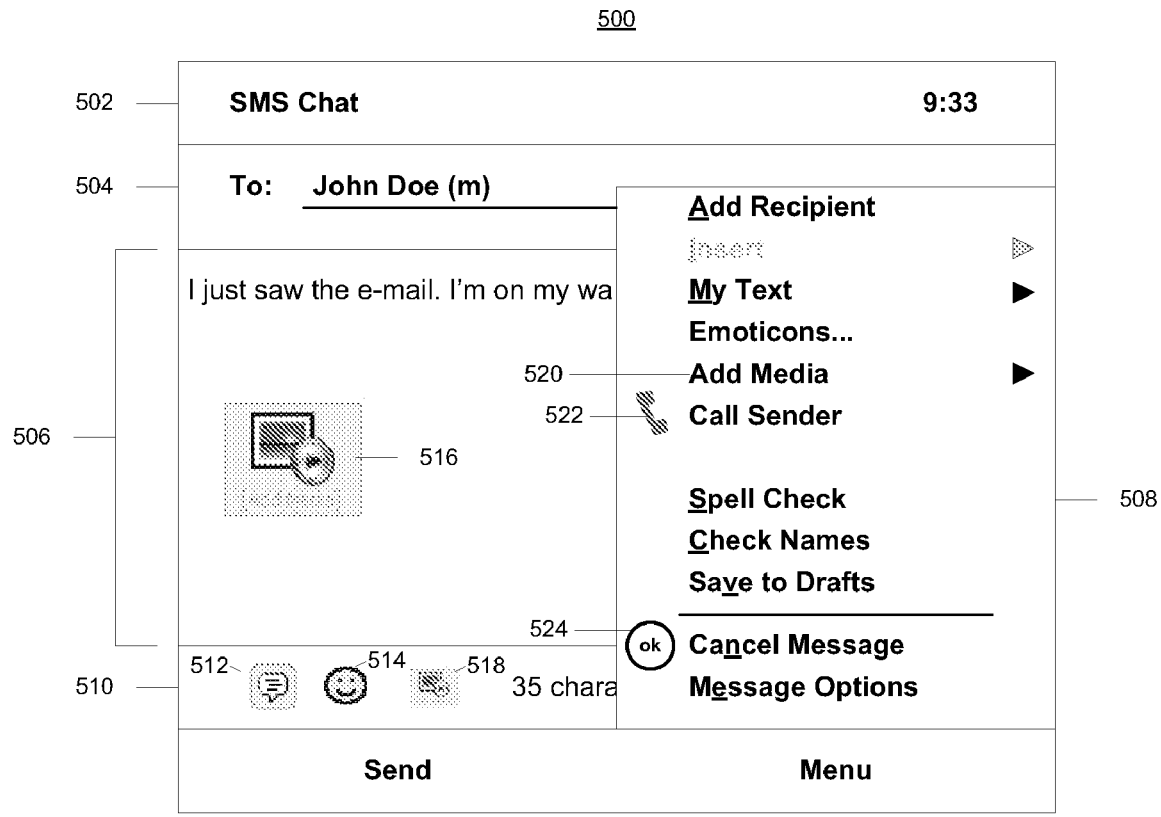
FIG. 5 illustrates a graphical user interface in accordance with one or more embodiments.

FIG. 5 illustrates a messaging UI 500 in accordance with one or more embodiments which may be displayed to a user of the mobile computing device 100 of FIG. 1. In various embodiments, the messaging UI 500 may be supported by an application such as an SMS application. For example, the messaging UI 500 may comprise an SMS compose view messaging UI. The embodiments, however, are not limited in this context.

As shown, the messaging UI 500 may comprise a title bar 502 for displaying the title of a particular messaging application and the current time. The messaging UI 500 also may comprise an address bar 504. As shown, the address bar 504 may comprise a 'To' field which may display the contact name (e.g., John Doe) through reverse look up in the contact records or the telephone number of the recipient. In some cases, the address bar 504 may comprise other items such as a 'CC' field, a 'BCC' field, a subject field, contact picture, status line (e.g., message priority, receipt status, errors, receipt request, validity period), callback number, vCard, vCal, and so forth.

The messaging UI 500 may comprise a message composition area 506 for entering message text. The messaging UI 500 may be arranged to display a menu 508 in response to pressing a menu button or by tapping and holding the screen, for example. Exemplary items or soft keys for the menu 508 may include, without limitation, Send, Add Recipient, Insert, My Text, Emoticons, Add Media, Add Picture, Add Video, Add Sound, Pick Sound, Record Sound, Add Callback Number, Add vCard, Add vCal, Clear, Select All, Paste, Copy, Cut, Undo, Save to Drafts, Save as Template, Spell Check, Check Names, Cancel Message, Message Options, and so forth.

The messaging UI 500 may comprise a status bar 510. As shown, the status bar 510 may comprise a text button 512 for displaying a pop-up list of boilerplate text strings that can be inserted into messages and edited. The status bar 510 may comprise an emoticon button 514 to display a pop-up of emoticons that can be inserted into the text area.

In various embodiments, the messaging UI 500 may allow the user to add media objects such as pictures, video, and/or sounds to a message. In some embodiments, for example, the message composition area 506 may comprise one or more add media button and/or an add media soft key. For example, the message composition area 506 may comprise an add media button 516, the status bar 510 may comprise an add media button 518, and/or the menu 508 may comprise an Add Media soft key 520. The embodiments are not limited in this context.

When the user selects to add media, the user may be presented with a picture/video recorder picker and/or a sound recorder or picker. In some cases, the user may be presented with an intermittent dialog warning the user about the fact that the messaging service might charge more for delivering media objects.

In various embodiments, the messaging UI 500 may enable a user to compose messages of different types of formats using the same unified messaging UI. In one embodiment, for example, the messaging UI 500 may comprise a unified messaging UI for SMS messages and MMS messages. In such an embodiment, after a media object has been added to the message, the messaging UI 500 may undergo an automatic or seamless conversion for supporting the transmission of the media objects. For example, the messaging UI 500 may automatically or seamless convert from an SMS messaging UI to an MMS messaging UI, and the message will be sent as an MMS message. In the event that the user adds a media object and then removes the media object, the messaging UI 500 may automatically or seamless convert back from an MMS messaging UI to an SMS messaging UI. If the user does not add any media to the message, conversion does not take place, and the message may be sent as an SMS message. The embodiments, however, are not limited to this example.

In this embodiment, the messaging 500 UI may comprise a unified messaging UI supporting composition of SMS messages and MMS messages. It can be appreciated that the embodiments are not limited in this context and that the unified messaging UI may be implemented to support using various types of messages as well as various types of supporting messaging applications. In some implementations, for example, the message options soft key may enable the user to select among various types of message conversions and/or delivery methods for sending a composed message. In such implementations, the user may compose a message in one format (e.g., SMS) and then convert or send the message in another format (e.g., MMS, e-mail, IM, etc.) In some cases, the conversion of a message from one format to a particular sending format may be based on programmed and/or detected preferences, constraints, and/or availability of a recipient to receive messages of a certain format. The embodiments are not limited in this context.

As shown in FIG. 5, the menu 508 may comprise icons associated with certain menu items or soft keys. In this embodiment, for example, the menu 508 comprises a talk button icon 522 associated with and displayed next to the Call Sender soft key. The menu 508 also comprises an 'ok' button icon 524 associated with and displayed next to the Cancel Message soft key. In such an embodiment, the mobile computing device may comprise a talk hardware button and an 'ok' hardware button.

Figure 6:
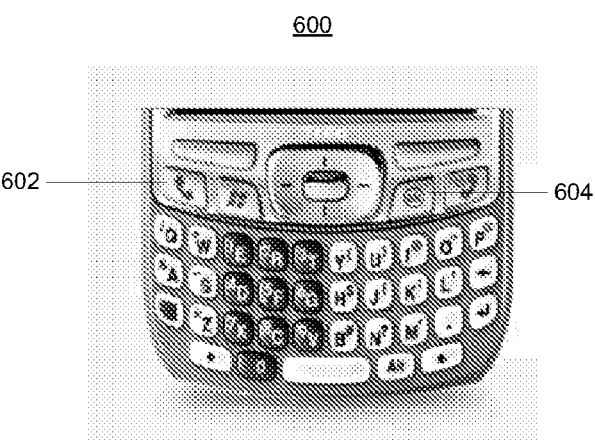
FIG. 6 illustrates a keypad for a mobile computing device in accordance with one or more embodiments.

FIG. 6 illustrates a keypad 600 in accordance with one or more embodiments which may be implemented by the mobile computing device 100. As shown, the keypad 600 may comprise various hardware buttons including a talk button 602 and an 'ok' button 604.

In various embodiments, while in compose mode, the user may call the sender by selecting the Call Sender menu item in the menu 508 of the messaging UI 500 and/or by pressing the talk hardware button 602 on the keypad 600. Likewise, the user may cancel a message by selecting the Cancel Message menu item in the menu 508 of the messaging UI 500 and/or by pressing the 'ok' hardware button 604 on the keypad 600. Accordingly, in such embodiments, the talk button icon 522 and the 'ok' button icon 524 may serve to educate the user as to alternative, easier, and/or quicker ways to perform various messaging operations. The embodiments are not limited in this context.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device configured to send and receive messages of different types wirelessly, comprising:
a display;
a memory resource; and
one or more processors coupled to the display and the memory resource, the one or more processors configured:
determine at least one of a sender of a received message and a recipient of a sent message;
correlate (i) received messages of different message types with a particular sender, and (ii) sent messages of different types with a particular recipient;
communicate with a threading rules database stored in the memory resource, the threading rules database storing rules and parameters for controlling threading operations for the messages of different types;
generate a messaging thread comprising correlated messages of different message types in a messaging user interface supported by a messaging application; and
present the messaging thread in the messaging user interface on the display;
wherein the different message types correlated within the message thread are not limited to a message type associated with the messaging application.

2. The mobile computing device of claim 1, wherein the messages of different types includes at least one or more of telephone messages, voicemail messages, fax messages, video conferencing messages, instant messaging (IM) messages, e-mail messages, short message service (SMS) messages, and multimedia message service (MMS) messages.

3. The mobile computing device of claim 1, wherein determining at least one of the sender or the recipient comprises using identifying information from a message, the identifying information including at least one or more of a telephone number, an e-mail address, an instant messaging screen name, a short message service identifier, and a multimedia messaging service identifier.

4. The mobile computing device of claim 3, wherein correlating received messages and sent messages includes matching identifying information against stored contact records.

5. The mobile computing device of claim 1, wherein the messaging thread comprises correlated messages including at least one SMS message or MMS message, and at least one or more telephone messages, voicemail messages, fax messages, video conferencing messages, IM messages.

6. The mobile computing device of claim 1, wherein the messaging application comprises an SMS messaging application.

7. The mobile computing device of claim 6, wherein the messaging user interface comprises at least one of an SMS list view messaging user interface and an SMS chat view user interface.

8. The mobile computing device of claim 1, wherein an appearance of a particular correlated message changes based on age or relevance of the particular correlated message.

9. The mobile computing device of claim 1, wherein the messaging user interface comprises a hyperlink to retrieve archived messages.

10. The mobile computing device of claim 1, wherein the messaging user interface includes a unified composer messaging interface to enable a user to compose messages of different types.

11. The mobile computing device of claim 10, wherein the unified composer messaging interface is configured to automatically convert between different message types.

12. The mobile computing device of claim 10, wherein the unified composer messaging interface to enables a user to compose a message comprising one or more media objects.

13. The mobile computing device of claim 12, wherein the unified composer messaging interface enables a user to compose SMS messages and MMS messages, wherein MMS messages are composed when it includes at least one media object.

14. The mobile computing device of claim 10, wherein the unified composer messaging interface enables a user to compose a message as one message type and send as a different message type.

15. The mobile computing device of claim 1, wherein the messaging interface comprises an icon corresponding to a hardware button of the mobile computing device.

16. A method for providing a messaging thread on a mobile computing device, the method being performed by one or more processors of the mobile computing device and comprising:
- determining at least one of a sender of a received message and a recipient of a sent message;
- correlating (i) received messages of different message types with a particular sender, and (ii) sent messages of different types with a particular recipient;
- communicating with a threading rules database stored in a memory resource, the threading rules database storing rules and parameters for controlling threading operations for the messages of different types;
- generating the messaging thread comprising correlated messages of different message types in a messaging user interface supported by a messaging application, wherein the different message types correlated within the message thread are not limited to a message type associated with the messaging application; and
- presenting the messaging thread in the messaging user interface on a display of the mobile computing device.

17. The method of claim 16, wherein the messages of different types includes at least one or more of telephone messages, voicemail messages, fax messages, video conferencing messages, instant messaging (IM) messages, e-mail messages, short message service (SMS) messages, and multimedia message service (MMS) messages.

18. The method of claim 16, wherein determining at least one of the sender or the recipient comprises using identifying information from a message, the identifying information including at least one or more of a telephone number, an e-mail address, an instant messaging screen name, a short message service identifier, and a multimedia messaging service identifier.

19. The method of claim 18, wherein correlating received messages and sent messages includes matching identifying information against stored contact records.

20. The method of claim 16, wherein the messaging thread comprises correlated messages including at least one SMS message or MMS message and one or more telephone messages, voicemail messages, fax messages, video conferencing messages, IM messages.

21. The method of claim 16, wherein an appearance of a particular correlated message changes based on age or relevance of the particular correlated message.

22. The method of claim 16, wherein the messaging user interface comprises a hyperlink to retrieve archived messages.

23. The method of claim 16, wherein the messaging user interface includes a unified composer messaging interface to enable a user to compose messages of different types.

24. The method of claim 23, wherein the unified composer messaging interface is configured to automatically convert between different message types.

25. The method of claim 23, wherein the unified composer messaging interface enables a user to attach one or more media objects to a message.

26. The method of claim 25, wherein the unified composer messaging interface enables a user to compose SMS messages and MMS messages, wherein MMS messages are composed when it includes at least one media object.

27. The method of claim 23, wherein the unified composer messaging interface enables a user to compose a message as one message type and send as a different message type.

28. The method of claim 16, wherein the messaging interface comprises an icon corresponding to a hardware button of the mobile computing device.

29. A non-transitory computer-readable storage medium comprising instructions, the instructions when executed by one or more processors of a mobile computing device cause the mobile computing device to perform the steps of:
- determining at least one of a sender of a received message and a recipient of a sent message;
- correlating (i) received messages of different message types with a particular sender, and (ii) sent messages of different types with a particular recipient;
- communicating with a threading rules database stored in a memory resource, the threading rules database storing rules and parameters for controlling threading operations for the messages of different types;
- generating a messaging thread comprising correlated messages of different message types in a messaging user interface supported by a messaging application, wherein the different message types correlated within the message thread are not limited to a message type associated with the messaging application; and
- presenting the messaging thread in the messaging user interface on a display of the mobile computing device.

30. The storage medium of claim 29, wherein the messages of different types includes at least one or more of telephone messages, voicemail messages, fax messages, video conferencing messages, instant messaging (IM) messages, e-mail messages, short message service (SMS) messages, and multimedia message service (MMS) messages.

31. The storage medium of claim 29, wherein determining at least one of the sender or the recipient comprises using identifying information from a message, the identifying information including at least one or more of a telephone number, an e-mail address, an instant messaging screen name, a short message service identifier, and a multimedia messaging service identifier.

32. The storage medium of claim 31, wherein correlating received messages and sent messages includes matching identifying information against stored contact records.

33. The storage medium of claim 29, wherein the messaging thread comprises correlated messages including at least one SMS message or MMS message and one or more telephone messages, voicemail messages, fax messages, video conferencing messages, IM messages.

34. The storage medium of claim 29, wherein an appearance of a particular correlated message changes based on age or relevance of the particular correlated message.

35. The storage medium of claim 29, wherein the messaging user interface comprises a to retrieve archived messages.

36. The storage medium of claim 29, wherein the messaging user interface includes a unified composer messaging interface to enable a user to compose messages of different types.

37. The storage medium of claim 36, wherein the unified composer messaging interface is configured to automatically convert between different message types.

38. The storage medium of claim 36, wherein the unified composer messaging interface enables a user to attach one or more media objects to a message.

39. The storage medium of claim 38, wherein the unified composer messaging interface enables a user to compose SMS messages and MMS messages, wherein MMS messages are composed when it includes at least one media object.

40. The storage medium of claim 36, wherein the unified composer messaging interface enables a user to compose a message as one message type and send as a different message type.

41. The storage medium of claim 29, wherein the messaging interface comprises an icon corresponding to a hardware button of the wireless computing device.

* * * * *